United States Patent
Leahy et al.

(10) Patent No.: US 6,671,755 B1
(45) Date of Patent: Dec. 30, 2003

(54) SYSTEM FOR DATA CAPTURE FROM A ROTOR

(75) Inventors: Martin J Leahy, Limerick (IE); Catherine Byrne, Limerick (IE); Stephen Clothier, Limerick (IE); Gerard O'Regan, Limerick (IE); Philip Samways, Limerick (IE); Jeffrey Punch, Limerick (IE); Mark Davies, Limerick (IE)

(73) Assignee: Forfàs, Dublin (IE)

( * ) Notice: Subject to any disclaimer, the term of this patent is extended or adjusted under 35 U.S.C. 154(b) by 0 days.

(21) Appl. No.: 09/576,212

(22) Filed: May 23, 2000

(30) Foreign Application Priority Data

May 24, 1999 (IE) .................................................. 990417

(51) Int. Cl.⁷ ............................................. G06F 13/12
(52) U.S. Cl. .............................. 710/69; 700/73; 700/74; 702/48; 702/57; 327/9; 73/66; 73/660
(58) Field of Search ................................ ; G06F 13/12

(56) References Cited

U.S. PATENT DOCUMENTS 5,390,545 A * 2/1995 Doan ........................... 73/650
5,965,819 A * 10/1999 Piety et al. ................... 73/660

FOREIGN PATENT DOCUMENTS

EP 0798884 A2 10/1997

* cited by examiner

*Primary Examiner*—Jeffrey Gaffin
*Assistant Examiner*—Niketa Patel
(74) *Attorney, Agent, or Firm*—Jacobson Holman PLLC

(57) ABSTRACT

A data capture system (1) has modular amplifier circuits (10) connected to modular capture circuits (11) within a rotor 2. Each capture circuit (11) has an FPGA (26) operation according to low-frequency and high-frequency state machines (M1, M2) to control ADCs (25) and upload from memories (30) to a host (15) During sampling, each FPGA (26) runs through a ready mode, a sampling mode, and again a ready mode according to a host command.

17 Claims, 4 Drawing Sheets

SYSTEM FOR DATA CAPTURE FROM A ROTOR

FIELD OF THE INVENTION

The invention relates to acquisition of data from a rotor.

PRIOR ART DISCUSSION

There are many situations in which it is desirable to capture data from a moving body such as a turbine rotor. Heretofore, the approach has been to communicate data via slip rings and one approach to achieving this is described in PCT Patent Specification No. EP0798884. In this approach there is frequency modulation and multiplexing across an optical slip ring. Because there is frequency modulation data integrity is not affected by unexpected intensity variations and because of signal overlap between adjacent transmitters and continuity of the signal is ensured. However, for some environments such data transfer is not suitable because of electromagnetic noise, bandwidth restrictions, resolution and FDM tuning problems, and the physical size of the analog circuitry required. These difficulties apply particularly if rotor speeds arc quite high, in excess of 7000 rpm.

It is therefore an object of the invention to provide a data capture system to overcome these problems.

SUMMARY OF THE INVENTION

The present invention relates to a data capture system for interfacing with transducers and for transferring data to an external host system. The data capture system acquires data from a rotor. The data capture system is part of the rotor and includes analog to digital converters for converting analog data from transducers to digital data. The digital data is stored in a memory. The data capture system includes a host interface for communicating the data with an external host system. The capture system includes a data processor which receives the data from the analog to digital converters and writes the data to memory and controls the uploading of data from the memory to the external host system and for receiving control commands through the host interface.

The data capture system of the present invention includes a plurality of physically separate circuits mounted within a rotor which rotates symmetrically about the rotor axis.

analog to digital converters for converting transducer analog signals to digital data;

a memory;

a host interface for communication of data with an external host system; and a data processor comprising means for receiving data from the analog to digital converters, for writing said data to the memory and for controlling upload of data from the memory to an external system and for receiving control commands via said host interface.

In one embodiment, the processor comprises means for operating in a cycle comprising a ready mode, a data capture mode, and return to a ready mode, and for initiating the cycle according to commands received from an external host.

In one embodiment, the processor comprises means for writing data to a mapped memory section during the ready modes and for repeatedly over-writing said memory section.

In another embodiment, the system further comprises a low pass filter and the processor comprises means for writing only a portion of the samples to the memory and for activating said filter during the ready modes.

In one embodiment, the processor comprises means for writing data to the memory in a sequential pattern according to time of receipt, and for directing upload of the data in said pattern.

In another embodiment, the processor comprises means for writing data words to the memory in sequence, each word comprising all simultaneous data from all analog to digital converters.

In one embodiment, the system further comprises:

a signal conditioning circuit comprising means far conditioning received transducer signals, and an amplifier for the output of the signal conditioning circuit In one embodiment, the system comprises a plurality of physically separate circuits, each comprising analog to digital converters, a processor, and a memory, each circuit being of elongate shape and comprising means for mounting within a rotor symmetrically about the rotor axis.

In a further embodiment, the system comprises a master clock source connected to all of the processors, and each processor comprises means for operating according to a high frequency clock for processor operations and according to a lower frequency dock for host interfacing operations.

In one embodiment, the host interface comprises a serial interface associated with each processor.

In one embodiment, each processor has an associated serial interfacing clock source and comprises means for synchronising the interfacing clock according to the master clock.

In another embodiment, each processor comprises means for operating according to state machines and the system comprises means for providing a synchronised state machine clock to all processors.

In a further embodiment, each processor comprises means for operating according to two state machines (M1, M2), one operating at a lower frequency than the other.

In one embodiment, the state machine operating at the lower frequency is used for putting the analog to digital converters into standby mode, for synchronising the analog to digital converters, and for initiating a calibration cycle for the analog to digital converters.

In another embodiment, each processor comprises means for also using the lower frequency state machine for transmitting status data to an external host via the host interface.

In a further embodiment, each processor comprises means for using the higher-frequency state machine to control read-back of stored data and for sending status data to a host.

Preferably, each processor comprises means for interlinking the state machines via a re-timing circuit.

In one embodiment, re-timing circuit comprises a D-type flip-flop.

DETAILED DESCRIPTION OF THE INVENTION

DESCRIPTION OF THE DRAWINGS

The invention will be more clearly understood from the following description of some embodiments thereof, given by way of example only with reference to the accompanying drawings in which.

DESCRIPTION OF THE EMBODIMENTS

Figure 1:
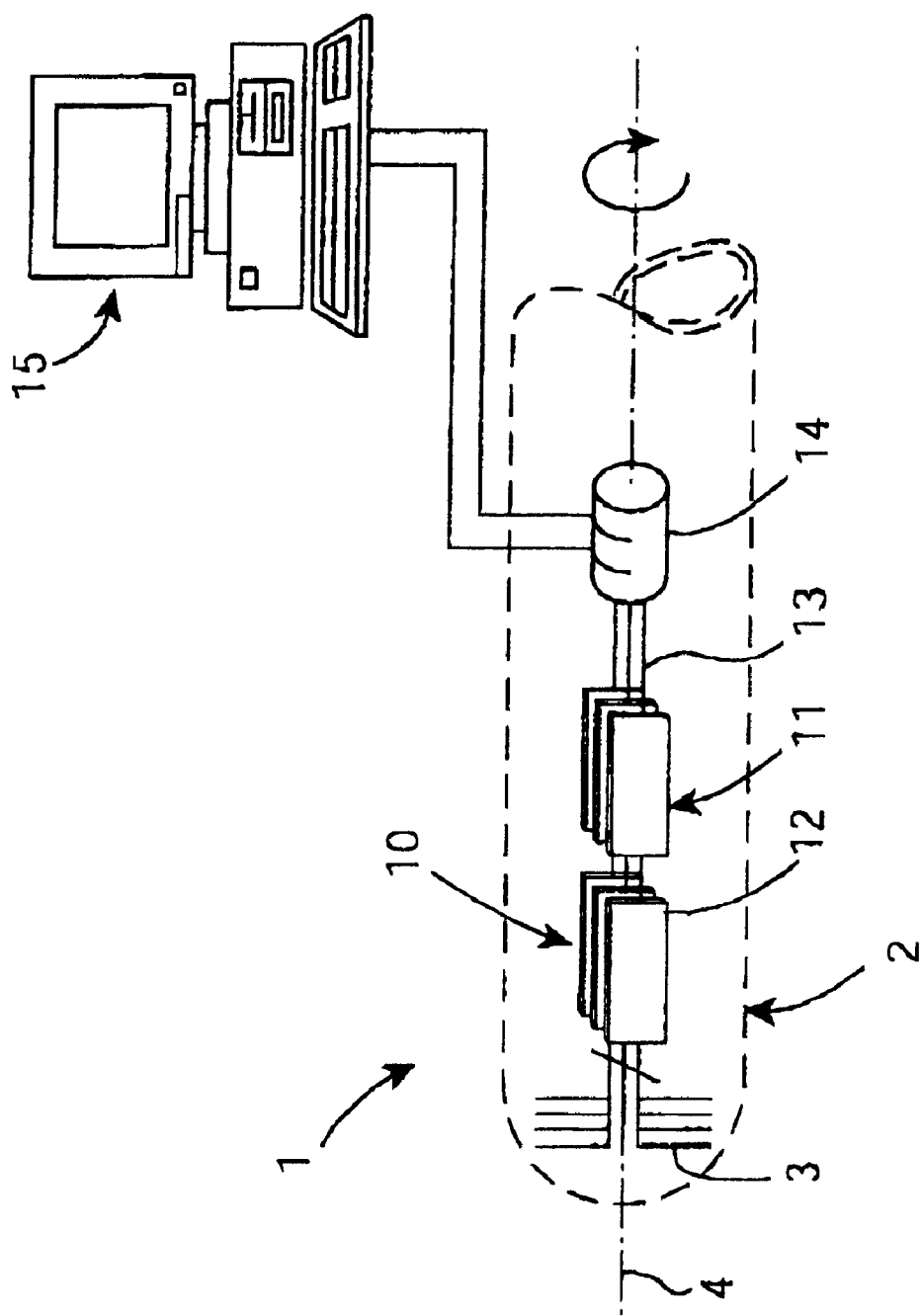
FIG. 1 is a perspective diagrammatic view of a data capture system of the invention.

Referring to FIG. 1 there is shown a data capture system 1 for use in a mechanical rotor system 2 having a central shaft indicated by interrupted lines and turbines, not shown. Signal cables 3 are connected to transducers in the system such as strain gauges. The mechanical system rotates about an axis 4.

The system 1 comprises a set of three modular amplifier circuits 10 which are connected to the strain gauge cables 3. The amplifier circuits 10 are in turn connected to three corresponding modular data capture circuits 11. The data capture circuits 11 are connected by a serial link 13 to a slip ring 14 for download of data to a host system 15 and to receive commands from the host system 15.

In brief, the mechanical system ramps up to a maximum speed of approximately 8000 rpm and at a certain point sampling is triggered by either a tachometer or the host system 15. A command is transmitted via the serial link 13 to the data capture circuit 11 to initiate sampling. Sampling involves data capture for a period of 0.2, 0.4, 0.6, or 0.8 seconds and different such periods may be chosen by the host system 15 in order to gather sufficient information for analysis of performance of the mechanical system. The data is stored in the data capture circuits 11 and it only downloaded subsequently. The downloads may take place as the shaft 2 is rotating, in which case the slip ring 14 is used, or it may take place when stationary.

Figure 2:
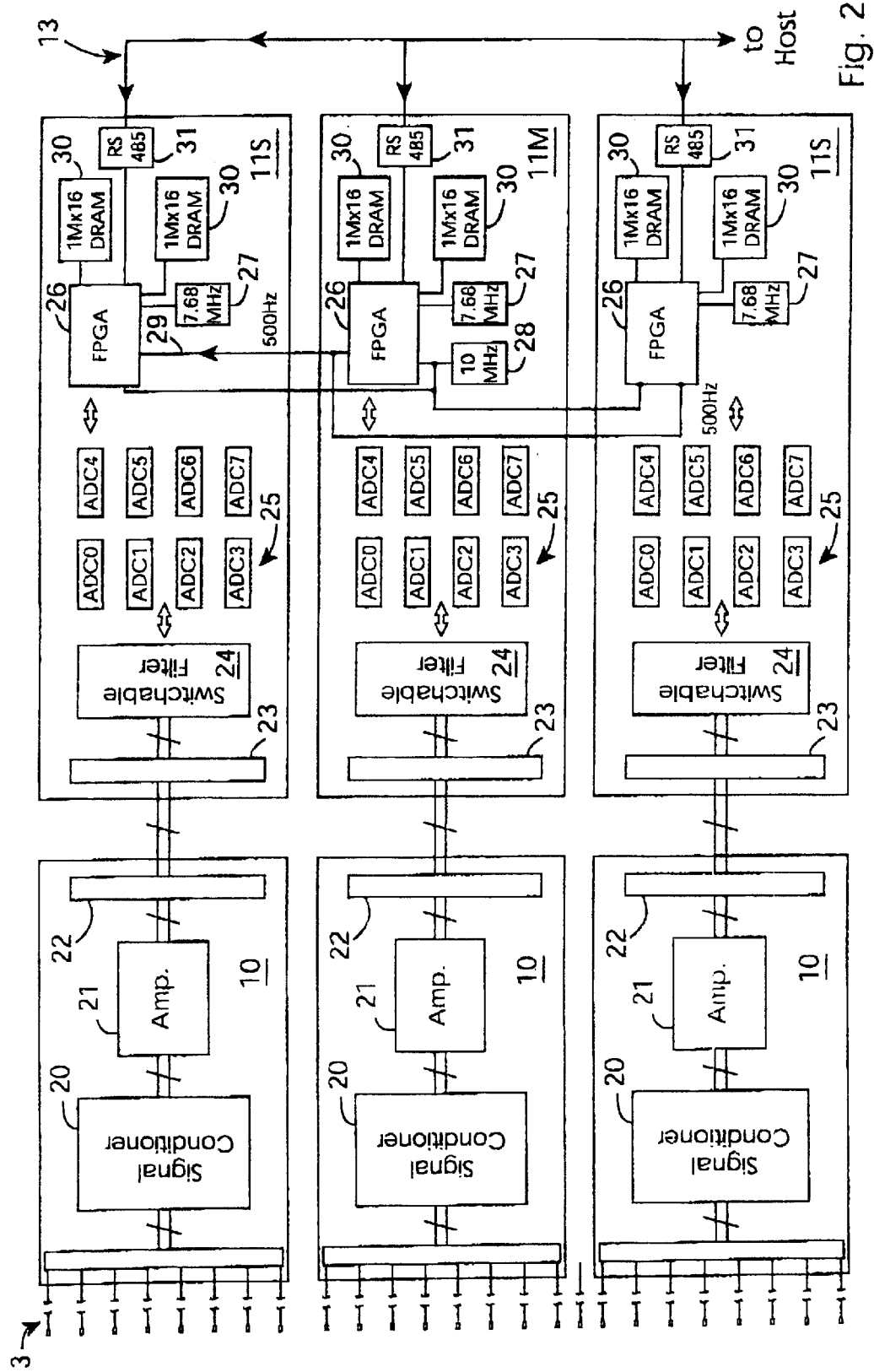
FIG. 2 is a block diagram illustrating data capture circuits of the system in more detail.

Referring now to FIG. 2, the system 1 is described in more detail. The cables 3 connect to a signal conditioning circuit 20 which conditions the signals to provide a linear voltage output. This signal is amplified by amplifiers 21 to provide a voltage output range of 0–2.5 V over the entire bandwidth.

The amplified output is provided at a connector 22. Thus, the function of each amplifier circuit 10 is to handle eight analog transducer channels and to provide conditioning and amplification channels to a corresponding data capture circuit 11.

A data capture circuit indicated by 11 M operates as a master and the other two, indicated by 11 S, operate as slaves. The primary difference between the master and the slaves is that the master hosts a master dock source which provides a master clock signal for all circuits.

In more detail, each data capture circuit 11 comprises a switchable low pass filter 24 which delivers the eight analog channels to eight analog to digital converters (ADCs) 25. The ADCs 25 are of the type which oversample and have internal digital filters. The digital output of the converters 25 is fed to a processor in this embodiment a field programmable gate array (FPGA) 26. Each FPGA 26 is connected to a serial clock source 27 providing 7.6 MHz. Also, the master data capture circuit 11 M includes a master clock source 28 which delivers 10 MHz to the on-board FPGA 26 and to the FPGAs 26 of the slave circuits 11 S. The FPGA 26 of the master circuit 11 M also derives a 500 Hz dock signal from the master clock signal and delivers this on lines 29 to the two slave circuits 11 S.

Each FPGA 26 is connected to two DRAM circuits 30, each of 16 Mb capacity. Each FPGA 26 is also connected to an RS 485 serial interface 31, which is in turn connected to the serial link 13 for communication with an external system via the slip ring 14.

The manner in which the FPGAs 26 are programmed is best understood by reference to operation of the system 1. For low frequency sampling the filter 24 has a 500 Hz low pass filter, and for high frequency sampling the filter has an antialiasing filter to allow sampling at 312.5 k samples per second.

The ADCs 25 are driven by the master dock at 10 MHz and new 16-bit samples are available every 32 clock periods, giving a sampling rate of 312.5 k samples per second. This is just greater than twice the signal bandwidth which provides for very efficient storage/transmission. It is made possible by the use of sigma-delta analog to digital oversampling in the ADCs 25. Each FPGA 26 synchronises and calibrates the ADCs 25 immediately prior to a sampling phase during which the eight serial data streams are reconstructed in parallel format and stored in the memory chips 30. During sampling, the maximum number of samples stored corresponds to filling the two memory chips 30 on each circuit 11. Each sample includes eight channels and there are two bytes per channel providing a total of 16 bytes per sample.

Figure 3:
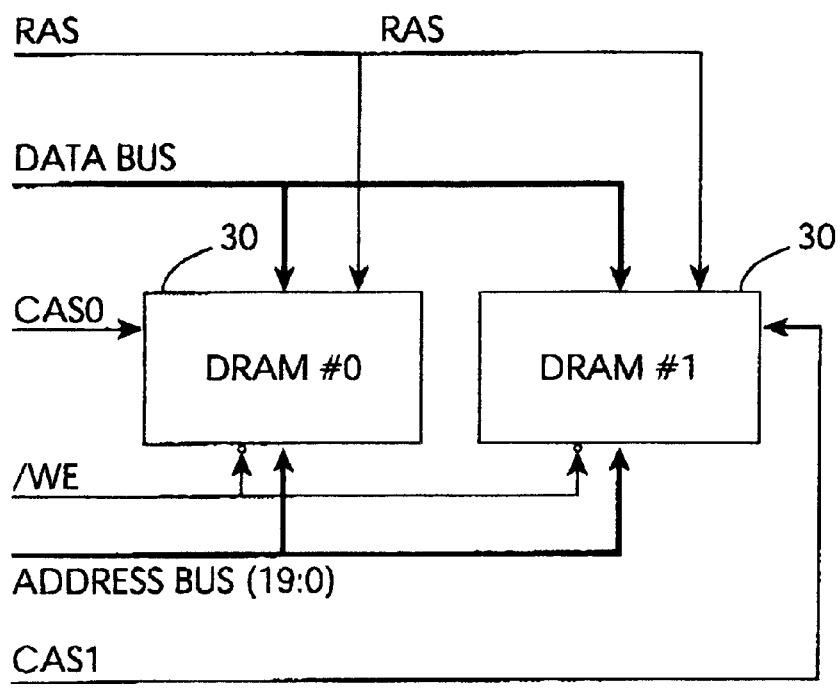
FIG. 3 is a diagram illustrating connection of memory to a processor.

Referring to FIG. 3, the connection of the memory chips 30 to the FPGA 26 is illustrated. The data is written in an interleaved format as follows.

| Memory address | Data written |
| --- | --- |
| N | cha sample j |
| N + 1 | chb sample j |
| N + 2 | chc sample j |
| N + 3 | chd sample j |
| N + 4 | che sample j |
| N + 5 | chf sample j |
| N + 6 | chg sample j |
| N + 7 | chh sample j |
| N + 8 | cha sample j + 1 |
| N + 9 | chb sample j + 1 |
| . | . |
| . | . |

A very important aspect of the data capture is that the three data capture circuits 11 operate in synchronism according to the 10 MHz master clock and the location in the memories 30 derives directly from the time at which the sample was received. This is because the samples are written sequential order to the memories according to time of receipt and this pattern is mirrored in all of the memories 30 so that they operate as if they were one contiguous memory bank. This synchronism has been achieved by use of the master dock 28 on the master capture circuit 11 M and by directly connecting this clock to the slave capture circuits 11 S. In addition, the FPGA 26 of the master capture circuit 11 provides a state machine 500 Hz clock signal on the lines 29 to the two slave capture circuits 11 S. Use of this clock signal is described in more detail below.

Each FPGA 26 performs a cycle comprising a "ready" mode (alternatively referred to as a low speed sampling (LSS) mode), a sampling mode (alternatively referred to as a high speed sampling (HSS) mode), followed again by an LSS mode. As shown in FIG. 3, the signals to the two DRAMs 30 on each circuit 11 are common, apart from the signal CAS which effectively switches the storage (and read-out during read-back periods) from one DRAM to the other. For the lower half of the address range CAS0 is active and CAS1 is inactive. These roles are reversed for the upper half of the address range. This means that address bit 0 is used to select the active CAS.

Figure 4:
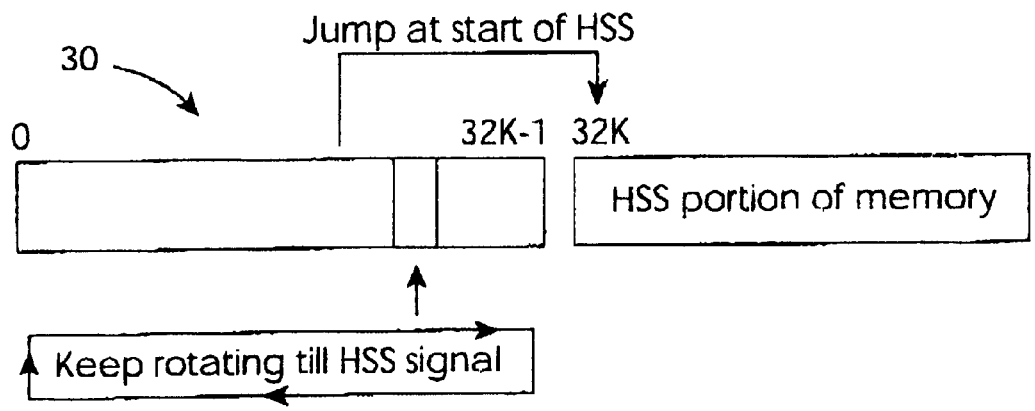
FIG. 4 is a flow diagram illustrating data sampling in different processor modes of operation.

As shown in FIG. 4, the LSS mode involves each FPGA filling a 32 K pre-mapped section of one of the DRAMs 30 by repeatably overwriting this mapped region. To do this, the FPGA switches the switchable filter 24 to the low pass setting which allows it to ignore 255 of every 256 incoming samples and use them to provide the LSS mode data to the pre-mapped memory region. The low pass filter removes high frequencies to prevent aliasing.

Each FPGA 26 then receives via the serial link 13 and the RS485 interface 31 a command signal from either a tachometer or from the external host system 15 to start sampling. Typically, this may arise when the rotor speed approaches a pre-set value such as after it has ramped up to 8000 rpm. When the FPGA 26 receives this signal it switches off the filter 24 and starts sampling at the full rate of all 312.5 k samples/sec. To start the HSS mode, the current value of the DRAM address is stored so that the first value read is this location (holding the oldest sample value). This address is held in a register in the FPGA 26. Also, the DRAM address must jump to the value $008000_H$, the start of the HSS region. Finally, the FPGA 26 also switches the filter 24 from a low frequency of approximately 500 Hz (for LSS) to approximately 1 MHz for the HSS mode. Each FPGA 26 then waits until the next LSS sample would have taken place and then commences HSS sample. This delay is to preserve the "phasing" of the recorded data. There is a maximum delay in time corresponding to one LSS sample period. The number of samples stored in the HSS mode is user-selectable via the serial link 13 before values may be selected according to the following table.

TABLE 1

Selectable Lengths of HSS Region

| Number of HSS samples/Channel | End address in Memory | Time duration |
|---|---|---|
| 32K (32,768) | $04FFFF_H$ | 0.105 s |
| 64K (65,536) | $08FFFF_H$ | 0.210 s |
| 128K (131,072) | $10FFFF_H$ | 0.420 s |
| 248K (253,952) | $1FFFFF_H$ (memory full) | 0.813 s |

Immediately following the selected period of HSS sampling, the system reverts to a period of LSS sampling, storing a further 4 K samples per channel in DRAM memory, before finishing the sampling and storage and returning to standby mode. Once again, the 'phasing' of the sampling is preserved in the transition from HSS to LSS sampling by creating a full LSS sample period between the last HSS samples and the first of the LSS samples. All sample periods (initial LSS, HSS, and final LSS) store the channel data in interleaved format in DRAM memory.

The FPGAs 26 use state machines to ensure correct timing and sequencing of their operations. These operations include the following.

1) Putting the ADCs 25 in standby mode at tie appropriate times to reduce power consumption and thus reduce thermal problems.
2) Synchronising the ADCs 25 so that the samples in all the channels are taken simultaneously.
3) Putting the ADCs 25 though a calibration cycle at the start of each sampling phase (i.e. immediately before all the samples are taken and stored in memory).
4) Sending status information to the host 15 through the serial interface 13. Examples of this are "ready for HSS command" and "all sampling completed".
5) Controlling the reading back of the stored sample data from the selected circuit 11 via the serial interface 13.
6) sending further data, such as a checksum and other status bytes such as "all data sent from selected circuit 11".
7) Controlling the passing of data from the serial interface 13 to and from internal registers. Commands from the host are sent to the internal registers of the FPGA (such as setting up which of the three circuits 11 is to send its data to the host) at certain expected times, and similarly data from internal registers back to the host (such as the status bytes and checksum mentioned above) is only allowed at certain times. This makes the system immune to errors.

The operations 1) to 4) above are relatively slow in nature as the ADCs require many system dock cycles to perform certain functions. An example is the calibration process. If a command is sent to the ADCs to calibrate them for accuracy, the ADCs require up to 1000 system clock cycles to perform the calibration. The synchronisation process requires a similar time. On the other hand, the sampling process and the storage of samples requires a high speed system clock In fact, the system dock period defines the sampling rate, which is a parameter of the overall system.

Also, the volume of data to be read back to the host 14 from each of the three boards (2 M samples, or 4 MBytes) requires a high baud rate of the serial interface 13, and thus the state machine controlling the reading of data from memory to the serial interface (item 5) above) must operate at a high clock speed.

Figure 5:
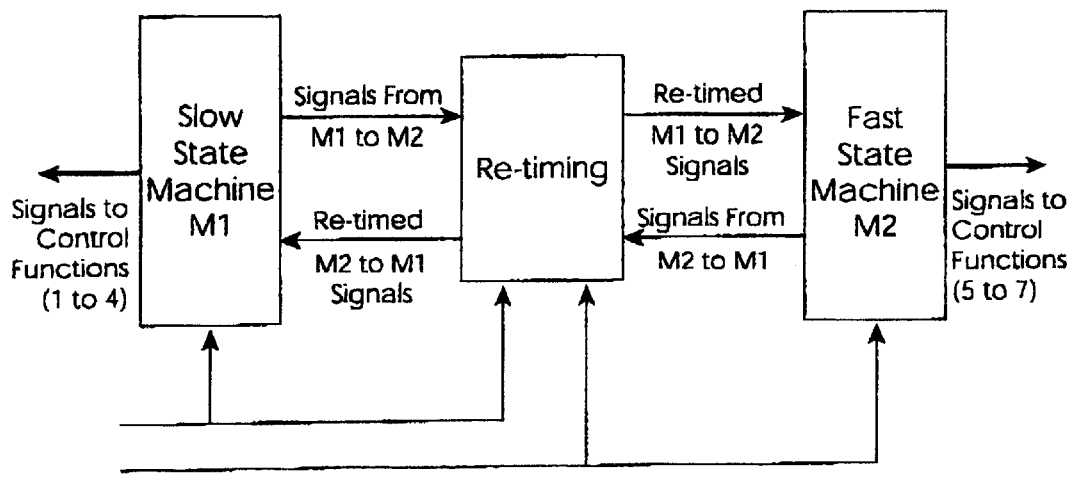
FIGS. 5 and 6 are diagrams illustrating state machine operation.

Thus, the control of operations in 1) to 4) requires a state machine with a slow clock (whose period is many thousand system clocks periods), whereas the control of operation 5 requires a state machine with a fast clock. To address this situation, each FPGA uses two state machines. One operates with the 500 Hz low speed clock (to control operations 1) to 4), and the other operates with the high speed 10 MHz system dock for operations 5) to 7). The approach of using two such interlinked state machines, minimises the use of gate array space and ensures synchronism between the three boards. The arrangement is illustrated in FIG. 5 in which the two state machines arc labelled M1 and M2.

Figure 6:
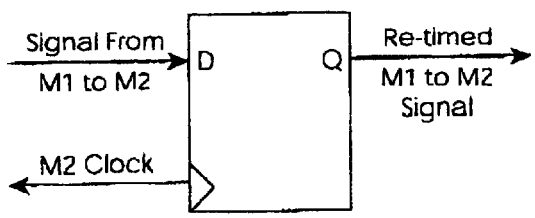

There are necessary signals between the two state machines i.e. from M1 to M2 and vice-versa. For reliable error-free operation these signals must be re-timed with the appropriate clock. For example, a signal from M1 to M2 must be re-timed with the clock used by M2 (in this case the fast clock). This re-tining is performed using a D-type flip-flop as shown in FIG. 6. This is a very simple, reliable, and effective circuit arrangement.

The invention is not limited to the embodiments described but may be varied in construction and detail within the scope of the claims.

What is claimed is:

1. A data capture system for interfacing with transducers and for transferring data to an external host system, said data capture system comprising a support for mounting within a rotor symmetrically about the rotor axis, said data capture system comprising a plurality of physically separate circuits, each being of elongate shape, each said circuit comprising:

analog to digital converters for converting transducer analog signals to digital data;

a memory;

a host interface for communication of data with an external host system; and a data processor for receiving data from the analog to digital converters, for writing said data to the memory and for controlling upload of data from the memory to an external host system and for receiving control commands via said host interface.

2. A system as claimed in claim 1, wherein the processor operates in a cycle comprising a ready mode, a data capture mode, and a return to a ready mode, and initiates the cycle according to commands received from an external host system.

3. A system as claimed in claim 2, wherein the processor writes data to a mapped memory section during the ready modes and repeatedly over-writes said memory section.

4. A system as claimed in claim 3, wherein the system further comprises a low pass filter, and the processor writes only a portion of the samples to the memory and activates said filter during the ready modes.

5. A system as claimed in claim 1, wherein the processor writes data to the memory in a sequential pattern according to time of receipt, and directs upload of the data in said pattern.

6. A system as claimed in claim 5, wherein the processor writes data words to the memory in sequence, each word comprising all simultaneous data from all analog to digital converters.

7. A system as claimed in claim 1, wherein each circuit further comprises:
   a signal conditioning circuit for conditioning received transducer signals, and
   an amplifier for the output of the signal conditioning circuit.

8. A system as claimed in claim 1, wherein the system comprises a master clock source connected to all of the processors of said circuits, and each processor operates to a high frequency clock for processor operations and according to a lower frequency clock for host interfacing operations.

9. A system as claimed in claim 8, wherein the host interface comprises a serial interface associated with each processor.

10. A system as claimed in claim 9, wherein each processor of said circuits has an associated serial interfacing clock source and synchronises the interfacing clock according to the master clock.

11. A system as claimed in claim 8 further comprising state machines within said circuits, wherein each processor of said circuits operates according to said state machines and the system provides a synchronised state machine clock to all processors.

12. A system as claimed in claim 11, wherein each processor operates according to two state machines, one operating at a lower frequency than the other.

13. A system as claimed in claim 12, wherein the state machine operating at the lower frequency is used for putting the analog to digital converters into standby mode, for synchronising the analog to digital converters, and for initiating a calibration cycle for the analog to digital converters.

14. A system as claimed in claim 13, wherein each processor also uses the lower frequency state machine for transmitting status data to an external host system via the host interface.

15. A system as claimed in claim 12, wherein each processor uses the higher-frequency state machine to control read-back of stored data and sends status data to an external host system.

16. A system as claimed in claim 12, wherein each processor interlinks the state machines via a re-timing circuit.

17. A system as claimed in claim 16, wherein the re-timing circuit comprises a D-type flip-flop.

* * * * *